United States Patent
Ganci, Jr. et al.

(10) Patent No.: US 10,778,786 B2
(45) Date of Patent: Sep. 15, 2020

(54) INTELLIGENT MULTI-DEVICE USER INTERACTION

(71) Applicant: International Business Machines Corporation, Armonk, NY (US)

(72) Inventors: John M. Ganci, Jr., Raleigh, NC (US); Sarbajit K. Rakshit, Kolkata (IN); James E. Bostick, Cedar Park, TX (US); Martin G. Keen, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/173,808

(22) Filed: Oct. 29, 2018

(65) Prior Publication Data
US 2020/0137175 A1 Apr. 30, 2020

(51) Int. Cl.
*H04L 29/08* (2006.01)
*G06F 40/205* (2020.01)

(52) U.S. Cl.
CPC .......... *H04L 67/16* (2013.01); *G06F 40/205* (2020.01); *H04L 67/125* (2013.01); *H04L 67/36* (2013.01)

(58) Field of Classification Search
CPC ....... H04L 67/16; H04L 67/36; H04L 67/125; G06F 17/2705; G06F 40/205
See application file for complete search history.

(56) References Cited

U.S. PATENT DOCUMENTS

| | | | |
|---|---|---|---|
| 6,345,279 B1 | 2/2002 | Li et al. | |
| 8,484,315 B2 | 7/2013 | Gautier | |
| 9,369,752 B2 | 6/2016 | Wyler | |
| 9,438,946 B2 | 9/2016 | Hasek et al. | |
| 9,820,098 B2 | 11/2017 | Hewitt et al. | |
| 2006/0105793 A1* | 5/2006 | Gutowski | H04W 4/029 455/518 |
| 2010/0186034 A1 | 7/2010 | Walker | |
| 2010/0198976 A1* | 8/2010 | Kawai | H04L 41/0213 709/230 |
| 2012/0155643 A1* | 6/2012 | Hassan | H04L 9/083 380/270 |

(Continued)

OTHER PUBLICATIONS

Cesar, Pablo, et al., "Multimedia Adaptation in Ubiquitous Environments: Benefits of Structured Multimedia Documents," Proceedings of the Eighth ACM Symposium on Document Engineering, pp. 275-284, ACM, 2008.

(Continued)

*Primary Examiner* — Azizul Choudhury
(74) *Attorney, Agent, or Firm* — Garg Law Firm, PLLC; Rakesh Garg; Brian Restauro

(57) ABSTRACT

A set of device information entries corresponding to a set of devices is constructed, where a device information entry includes (i) an indication of a capability of a device to present a content type, and (ii) a priority preference indicative of a priority of the device in a subset of devices where each device in the set of devices is capable of presenting the content type. Responsive to a request for presenting content of the content type, a sub-subset of the subset of devices is detected, where the sub-subset is enabled in an area where the content is to be presented. On a first device selected from the sub-subset, the content of the content type is presented.

16 Claims, 6 Drawing Sheets

(56) References Cited

U.S. PATENT DOCUMENTS

2014/0184910 A1* 7/2014 Bailey ............... H04N 21/4108
                                                        348/554
2014/0325053 A1  10/2014 Hewitt et al.
2017/0048562 A1   2/2017 Edson et al.

OTHER PUBLICATIONS

Malandrino, Delfina, et al., "MIMOSA: Context-Aware Adaptation for Ubiquitous Web Access," Personal and Ubiquitous Computing 14, No. 4, 2010, pp. 301-320.
Parsiegla, Volker, et al., "A Network Aware Protocol for Switching HTTP Streams between Devices," 2011 IEEE International Conference on Consumer Electronics-Berlin (ICCE-Berlin), pp. 74-78.
Apple.com, Use Continuity to Connect Your Mac, iPhone, iPad, iPod touch, and Apple Watch, Sep. 2018.

* cited by examiner

INTELLIGENT MULTI-DEVICE USER INTERACTION

TECHNICAL FIELD

The present invention relates generally to a method, system, and computer program product for user interaction involving more than one device. More particularly, the present invention relates to a method, system, and computer program product for intelligent multi-device user interaction.

BACKGROUND

Users interact with computer networks such as the Internet using a variety of devices with differing interaction capabilities. Traditional desktop computers typically include a keyboard and pointing device, and often a camera and microphone, for user input, and a screen and speakers for providing output to the user. Tablets typically do not have a dedicated keyboard or pointing device; instead users use a touchscreen capability, either with their fingers or a stylus. Smartphones have similar capabilities as tablets, but typically smaller screens—as well as the ability to make telephone calls. Tablets and smartphones may also be able to vibrate, providing haptic feedback to their users.

Smart watches must fit on users' wrists, necessitating small screens, small or no speakers, and user input via voice or a finger. Special glasses or other wearable devices project images into space in front of users while still allowing users to see the real world, allowing augmented reality applications. Virtual reality goggles also project images into space in front of users, but block users' view of the outside world. Users interact with both types of devices by speaking, directing their gaze, or perhaps using gestures or pointing. Users' cars should not distract the driver, necessitating interaction mostly through voice, but screens and a pointing device or touchscreen may also be available to entertain passengers or for more complicated interactions while the car is not moving.

Not all of users' devices travel with them. Smart speaker systems are always connected in users' homes, interacting with users only through speakers and microphones. Smart televisions typically have large display screens and include or are connected to large speakers for output. Some televisions may display content in three-dimensional format (3D) as well. Users typically provide input to smart televisions using a remote control, optional keyboard, or using a microphone. Auxiliary devices connected to televisions use the television's screen and speakers for output and a remote control, optional keyboard, or microphone for input. Gaming systems also typically include large screens and speakers, and game controllers, gesture recognition devices, and optional keyboards for input.

Users often use more than one device at a time. For example, one user may watch television while reading content on a tablet, while another may edit a document on a desktop computer while listening to streaming music on a smart speaker system. Either user may pause to take an incoming telephone call or reply to a text message.

SUMMARY

The illustrative embodiments provide a method, system, and computer program product. An embodiment includes a method that constructs a set of device information entries corresponding to a set of devices, a device information entry comprising (i) an indication of a capability of a device to present a content type, and (ii) a priority preference indicative of a priority of the device in a subset of devices wherein each device in the set of devices is capable of presenting the content type. An embodiment detects, responsive to a request for presenting content of the content type, a sub-subset of the subset of devices, wherein the sub-subset is enabled in an area where the content is to be presented. An embodiment presents, on a first device selected from the sub-subset, the content of the content type.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
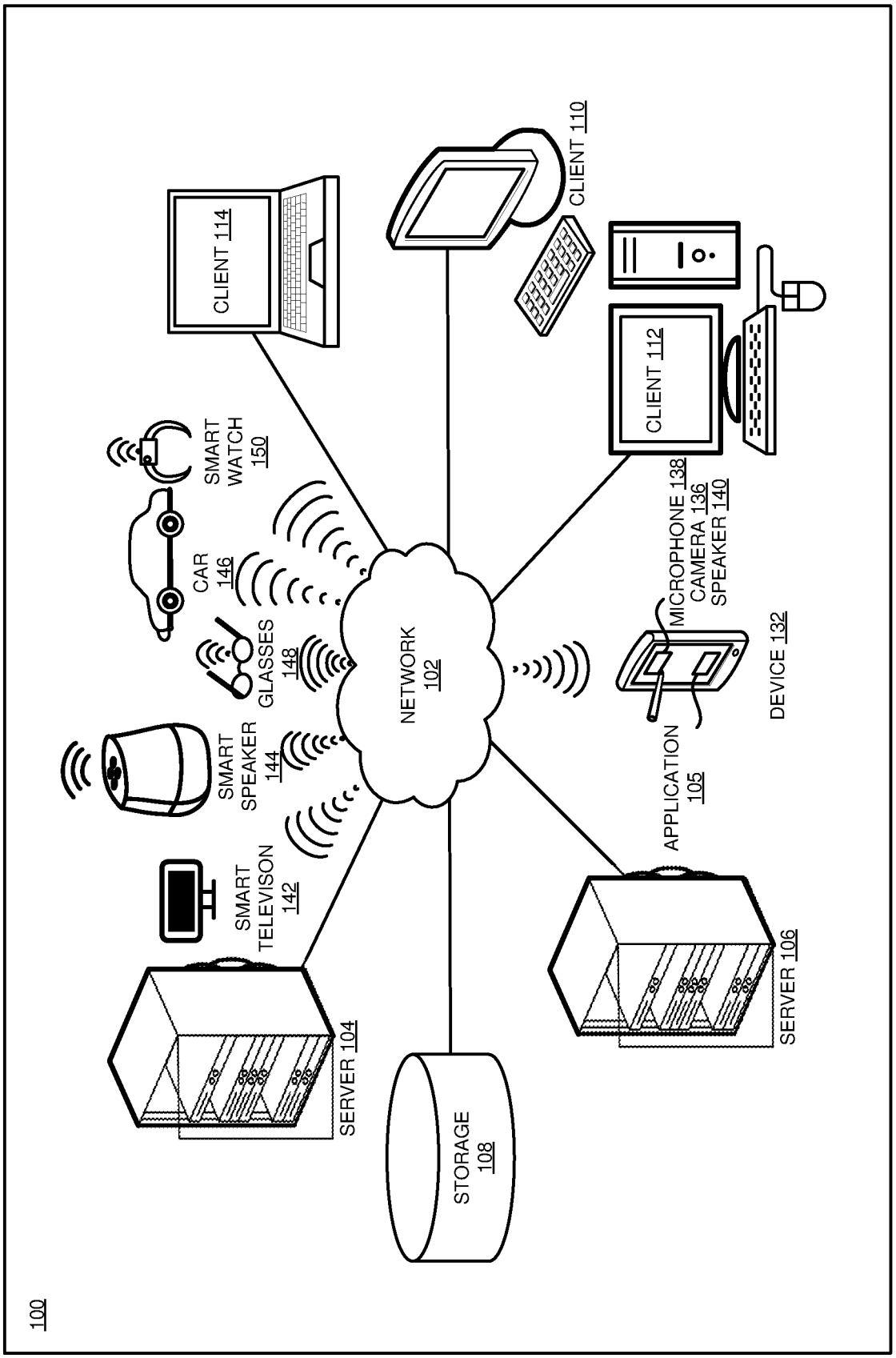
FIG. 1 depicts a block diagram of a network of data processing systems in which illustrative embodiments may be implemented.

Although users often have multiple devices, and even use multiple devices at the same time, typically whichever device a user uses to start an interaction is the same device that presents output to the user. For example, if a user types a query on the keyboard of a desktop or laptop computer, the computer will display the results of the query on the computer's display screen. Similarly, if a user asks a smart speaker to play music, the music will play over that device's speakers. Although some device ecosystems allow, for example, telephone calls to be routed to and answered on multiple devices (e.g. a smartphone and a tablet configured to communicate with each other), once the user answers a telephone call on one device, he or she continues listening to and talking on that same device until moving the call to a different device or terminating the call.

The illustrative embodiments recognize that such interactions do not take into account other devices of a user that might be available for use, including devices that might be better suited to presenting output to the user than the device a user is currently using or the device a user used for input.

A performance metric may determine whether one device is better suited than another for presenting output in particular circumstances. For example, a large television is better suited to display video content when the resolution of the video content exceeds a threshold value and the user is located within a specified distance of the television. However, a smart watch is better suited to display video content when the resolution of the video content can be downgraded without a loss of resolution higher than another threshold value and the user is moving faster than a threshold speed (for example, a speed consistent with walking or running). Similarly, large speakers, with a dynamic range greater than a threshold dynamic range, are better suited for listening to music content in a format having a similarly large dynamic range, provided the user is located within a specified distance of the speakers. However, a smart watch is better suited for listening to voice-based audio content having a dynamic range smaller than another threshold, when the user is moving faster than a threshold speed. A user's preference may also determine whether one device is better suited than another for presenting output in particular circumstances.

For example, a user may have searched, using his smartphone, for particular video content. However, the user is at home, and might prefer to watch the video content on his large-screen television instead of on a much smaller smartphone screen. As another example, a user may have asked her smartphone to play a particular piece of music. However, this user is in her car, and might prefer to listen to the music using the larger car speakers rather than the smaller speakers of her smartphone. As a third example, a user might have used her home smart speaker to search for a particular episode of an audio podcast. However, this user is about to go for her daily walk, and wants to listen to the episode via earbuds wirelessly connected to the smartphone she will take with her or the smart watch she will wear.

Further, the illustrative embodiments recognize that when multiple devices belonging to one device ecosystem or running one common operating system are configured to operate together, a user must make an explicit decision as to which device to use. For example, a user's smartphone and tablet, both running a common operating system and configured to operate together, may both offer a user an opportunity to answer an incoming telephone call, but the user must decide which one to use when the telephone call is received.

Further, the illustrative embodiments recognize that when multiple output methods are available, either on one device or several, a user must make an explicit decision as to which output method to use. For example, a user may have typed in a search on a smartphone while stopped at a traffic light. Such search results would normally be displayed in written form; if a user wants the results in spoken form, so as not to distract from driving, the user must make an explicit choice to change the output format. Similarly, if a user normally configures his smartphone or smart watch to sound an audible alert when a text message or telephone call is received, the user must consciously remember to turn off such audio alerts, or switch to vibration alerts instead, when in movies, concerts, meetings, and other circumstances when audio alerts would be inappropriate.

The illustrative embodiments recognize that the presently available tools or solutions do not address these needs or provide adequate solutions for these needs. The illustrative embodiments used to describe the invention generally address and solve the above-described problems and other problems related to intelligent multi-device user interaction.

An embodiment can be implemented as a software application. The application implementing an embodiment can be configured as a modification of an existing user interface system, as a separate application that operates in conjunction with an existing user interface system, a standalone application, or some combination thereof.

Particularly, some illustrative embodiments provide a method by which device capabilities and a user's present circumstances and preferences can be determined, and an appropriate device and output method chosen accordingly.

An embodiment performs a configuration process. As part of the configuration process, an embodiment determines the devices with which a user interacts.

An embodiment determines devices by asking the user to specify the devices. Alternatively, an embodiment determines devices without asking the user to specify the devices. One embodiment references all devices associated with a particular user account. For example, devices using the iOS operating system from Apple, Inc. may share information if they are all associated with a user's iCloud account; an appropriately-configured embodiment determines such a user's devices by referencing the user's iCloud account. (iOS is a registered trademark of Cisco, Inc. and iCloud is a registered trademarks of Apple, Inc. in the United States and other countries.) Another embodiment monitors a user's activity to determine which devices a user regularly interacts with. For example, a user's smartphone may hear a user interacting with a smart speaker system and add the smart speaker system to the list of devices. As another example, an embodiment detects, through credit card, email, or other account monitoring, that a user has bought a new smart television or an appropriately equipped vehicle. Another embodiment uses a combination of user specification and determination without explicit user specification to determine which devices a user regularly interacts with. For example, such an embodiment could determine all the devices associated with a user's iCloud account, then the user could add a smart speaker system from one manufacturer and a smart television from a different manufacturer. As well, other methods of determining which devices a user regularly interacts with are possible and contemplated within the scope of the embodiments.

Along with devices themselves, an embodiment determines specific device capabilities. A user can specify such capabilities—for example, that a television is capable of 3D rendering or that speakers are installed in a desktop computer.

As well, an embodiment determines such capabilities without a user's explicit specification. One embodiment determines device capabilities through a standard mechanism, such as by accessing a set of capabilities in a standard XML or other structured machine-readable format. Another embodiment queries devices that support a query-based or remote management capabilities determination mechanism. For example, many desktop computers and thin network clients can report their capabilities and installed devices to a remote application, for use in remote management of such devices. Another embodiment determines device capabilities by obtaining specifications for the devices, advertising material for the devices, or other descriptive material from any suitable source (such as stored in an embodiment or obtained by searching a network such as the Internet) and analyzing the specifications using any suitable natural language processing (NLP) techniques.

Another embodiment uses a combination of user-specified and user-independent methods to determine device capabilities. For example, a user can specify the name of a device, and the embodiment uses the name to determine associated characteristics.

Once an embodiment has determined a user's devices and each device's characteristics, an embodiment allows a user to specify an initial set of preferences. Such preferences include device priorities. For example, such preferences might include whether an embodiment should always display 3D video content on a device capable of 3D rendering, if one is available. As another example, such preferences might include always using car speakers and communicating with a user solely by voice whenever the user is in his or her car. Such preferences also include the use of single or multiple devices. For example, if a television, a laptop computer, and a tablet are all available to display content, one user might specify that only the device with the largest screen should be used, while another user might specify that all available devices be used. Such preferences also include radius and related location preferences. For example, a user might specify that a television is to be considered available for use if the user is within 25 feet of the television, but a smart watch is to be considered available for use if the user is within 2 feet of the watch, or actually wearing the watch. Another user might specify conditions when different devices are to be used—for example, when at home, the user's tablet has priority, while when away from home the user's smartphone has priority. As well, an embodiment includes a default initial set of preferences if the user chooses not to specify preferences.

An embodiment stores device information, capabilities, and user preferences in any suitable format, such as a relational database. Once an embodiment has determined a user's devices, each device's characteristics, and an initial set of preferences, the embodiment is ready for use. When in use, an embodiment monitors a user's input and circumstances to determine on which device (or devices) and using which format or formats to present output to the user.

An embodiment maintains a prioritized list of available devices capable of presenting each type of output to a user. For example, a television and a smartphone can present both audio and video content, but a smart speaker can only present audio. As another example, both a television and a smartphone can present both audio and video content, but the television is preferred when it is available. Alternatively, an embodiment is configurable to use all available devices for a type of output, instead of only the most preferred device.

An embodiment updates the list of available devices as a user's circumstances change. Typically, an embodiment runs on a user's main device, such as a smartphone, that a user carries most often. Assuming that the user and the main device are co-located, an embodiment determines which other devices are within a specified physical distance of the user by determining which other devices are within a specified physical distance of the main device. However, an embodiment can run on any of a user's devices. For example, if a user leaves home, the television is no longer available. If a user is driving, he or she should not be looking at a display screen. If a user is in a quiet area, audio output should not be used.

When an embodiment receives input from a user, the embodiment routes the output to the highest priority available device in the list of prioritized devices, or all the devices, capable of presenting that type of output to the user. For example, the output may be text, two-dimensional (2D) video, 3D video, or in holographic or audio form. Thus, for each content type, an embodiment consults the prioritized list of devices to see if any are available and sufficiently close to be used. In addition, if no nearby device is capable of presenting a particular content type, an embodiment attempts to convert the content type to a different, supported content type. For example, if the content is text, but no display screen is available, an embodiment can convert the text to speech and read the speech to the user.

For example, an embodiment detects that a user is home. An embodiment accomplishes such detection using geolocation (for example, using Global Positioning System (GPS), or triangulation/multi-angulation), by detecting the presence of devices that are not configured as portable devices (such as large televisions), by detecting the presence of devices that a user has indicated are installed at home, or in a particular place in the home (e.g. the television capable of 3D rendering is in the home theater room, or the smart speaker is in the kitchen), by monitoring the user as he or she interacts with particular devices (such as a smart speaker or a smart watch), or by any other suitable technique. When this user is home and near a television, he or she prefers to watch video content on the television. Thus, an embodiment displays video content on the television, rather than the user's smartphone or table. When this user is not near a display screen, but is near a smart speaker, an embodiment converts text to spoken word form to be played over the smart speaker.

As another example, an embodiment detects that a user is in his or her car. An embodiment accomplishes such detection using geolocation (for example, using GPS and mapping software to determine that the user is moving at a particular speed or range of speeds along roadways), by detecting the presence of devices known to be installed in the user's car (such as Bluetooth-capable speakers), by detecting the presence of devices that a user has indicated are installed in the car, or by any other suitable technique. (Bluetooth is a registered trademark of Bluetooth SIG, Inc. in the United States and other countries.) When the user is in his or her car, in accordance with the user's preferences, an embodiment converts all output text to audio played over the car speakers. All audio content is played over the car speakers as well. And video content is only played over display screens oriented towards the back passenger seats, to avoid distracting the driver.

As another example, an embodiment detects that a user is in an environment where smartphone audio output should not be heard—such as movie theater, concert venue, or a conference room at the user's office. An embodiment accomplishes such detection using geolocation, by detecting the presence of devices that are known to be permanently installed in that location (such as an office Wi-Fi network), or by any other suitable technique. (Wi-Fi is a registered trademark of Wi-Fi Alliance in the United States and other countries.) In such an environment, in accordance with a user's preferences an embodiment does not produce audio output on a user's smartphone or smart watch, but instead alerts the user using vibration, or displays text to the user silently.

An embodiment enables a user to move an output presentation from one device to another. For example, the television may be the highest priority device for displaying video content, but the user wants to watch on his smartphone instead. As another example, the smart speaker may be the highest priority device for presenting audio content, but the user is about to go for a walk and wants to listen using his smart watch instead.

An embodiment analyzes a user's activity to learn a user's preferences and usage patterns over time. For example, a user may wear or hold a smart watch, then switch audio output from a home smart speaker to the smart watch, every weekday morning at 7:45 am. After the user has repeated this pattern a predetermined number of times, or a specified number of times within a certain time frame, the embodiment adds the pattern to the user's device preferences. Thus, continuing the example, the embodiment always routes audio output to the user's smartwatch if the user is wearing the smart watch and it is a weekday morning around 7:45 am local time. As another example, if an embodiment determines that user always turns audio off on his smartphone when entering a particular conference room at her workplace or when participating in a certain recurring meeting on her calendar, the embodiment adds the pattern to the user's device preferences, converting audio alerts to a silent format without the user's having to do so manually. An embodiment also uses such patterns to detect a new device of user, and preferences and capabilities associated with such a module. For example, if a user installs a smart speaker in her kitchen, then begins to interact with the smart speaker and manually route audio output to the speaker, an embodiment detects this pattern and updates the user's devices and preferences to include those associated with the new smart speaker. An embodiment learns a user's preferences and usage patterns using any suitable technique, such as any pattern recognition or machine learning technique.

The manner of intelligent multi-device user interaction described herein is unavailable in the presently available methods. A method of an embodiment described herein, when implemented to execute on a device or data processing system, comprises substantial advancement of the functionality of that device or data processing system in dynamically determining which one or more available devices is best suited to content to be presented to a user, and presenting that content on the most suitable available device.

The illustrative embodiments are described with respect to certain types of input types, output types, location determinations, detections, preference determinations, responses, rankings, adjustments, sensors, measurements, devices, device capabilities, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
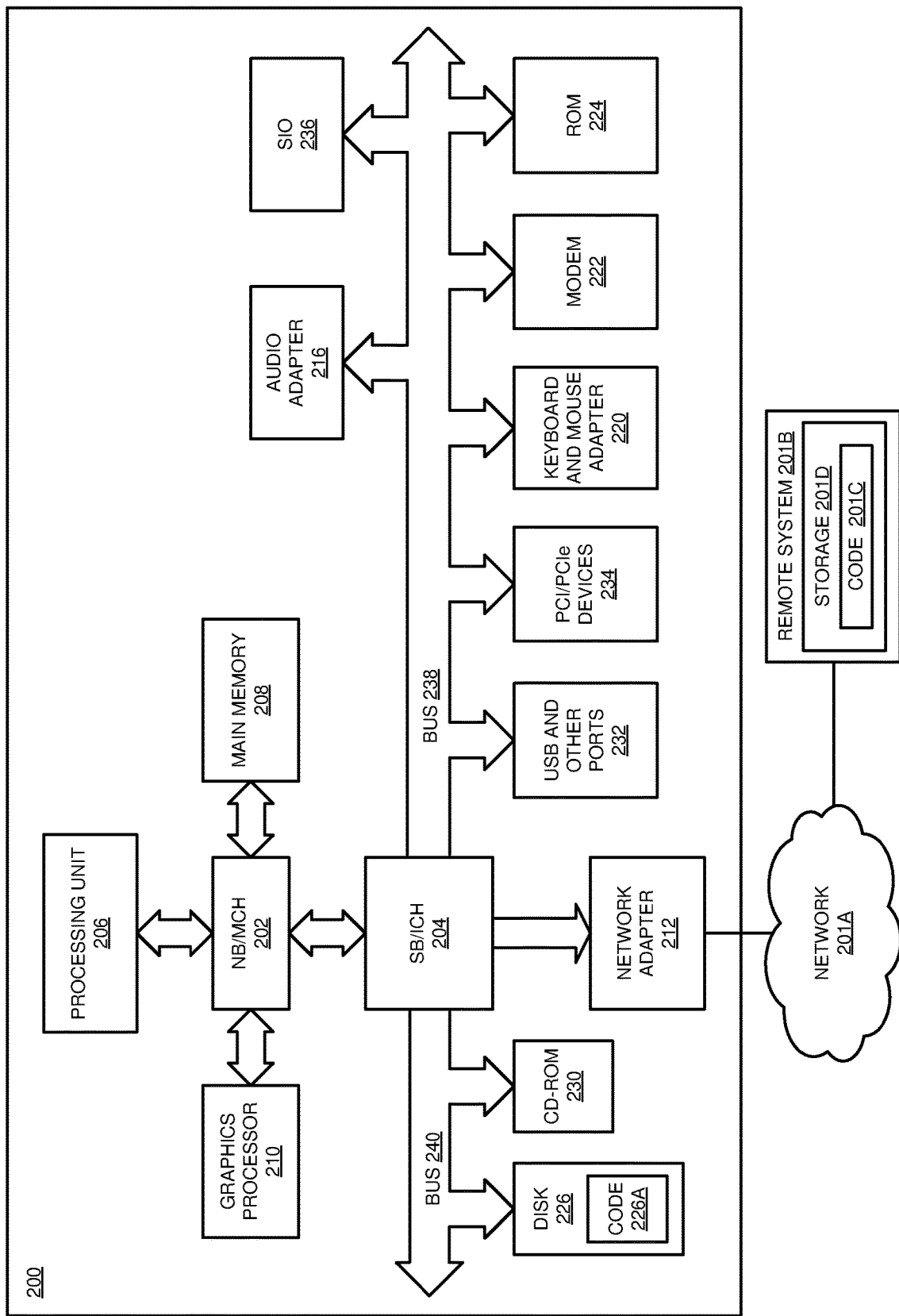
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Device 132 includes camera 136, microphone 138, and speaker 140. Smart television 142, smart speaker 144, car 146, smart glasses 148, and smart watch 150 are also example of a device described herein. Any software application described as executing in another data processing system in FIG. 1 can be configured to execute in device 132, smart television 142, smart speaker 144, car 146, smart glasses 148, and smart watch 150 in a similar manner. Any data or information stored or produced in another data processing system in FIG. 1 can be configured to be stored or produced in device 132, smart television 142, smart speaker 144, car 146, smart glasses 148, and smart watch 150 in a similar manner.

Application 105 implements an embodiment described herein. Application 105 executes in any device that includes sufficient memory, processing power, and other capabilities, such as any of servers 104 and 106, clients 110, 112, and 114, device 132, smart television 142, smart speaker 144, car 146, smart glasses 148, and smart watch 150. In addition, a main portion of an embodiment can execute in one device, and other portions of an embodiment can execute elsewhere, such as on a server or other component connected to a network.

Servers 104 and 106, storage unit 108, and clients 110, 112, and 114, device 132, smart television 142, smart speaker 144, car 146, smart glasses 148, and smart watch 150 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, or the operating system and applications of device 132, smart television 142, smart speaker 144, car 146, smart glasses 148, and smart watch 150 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
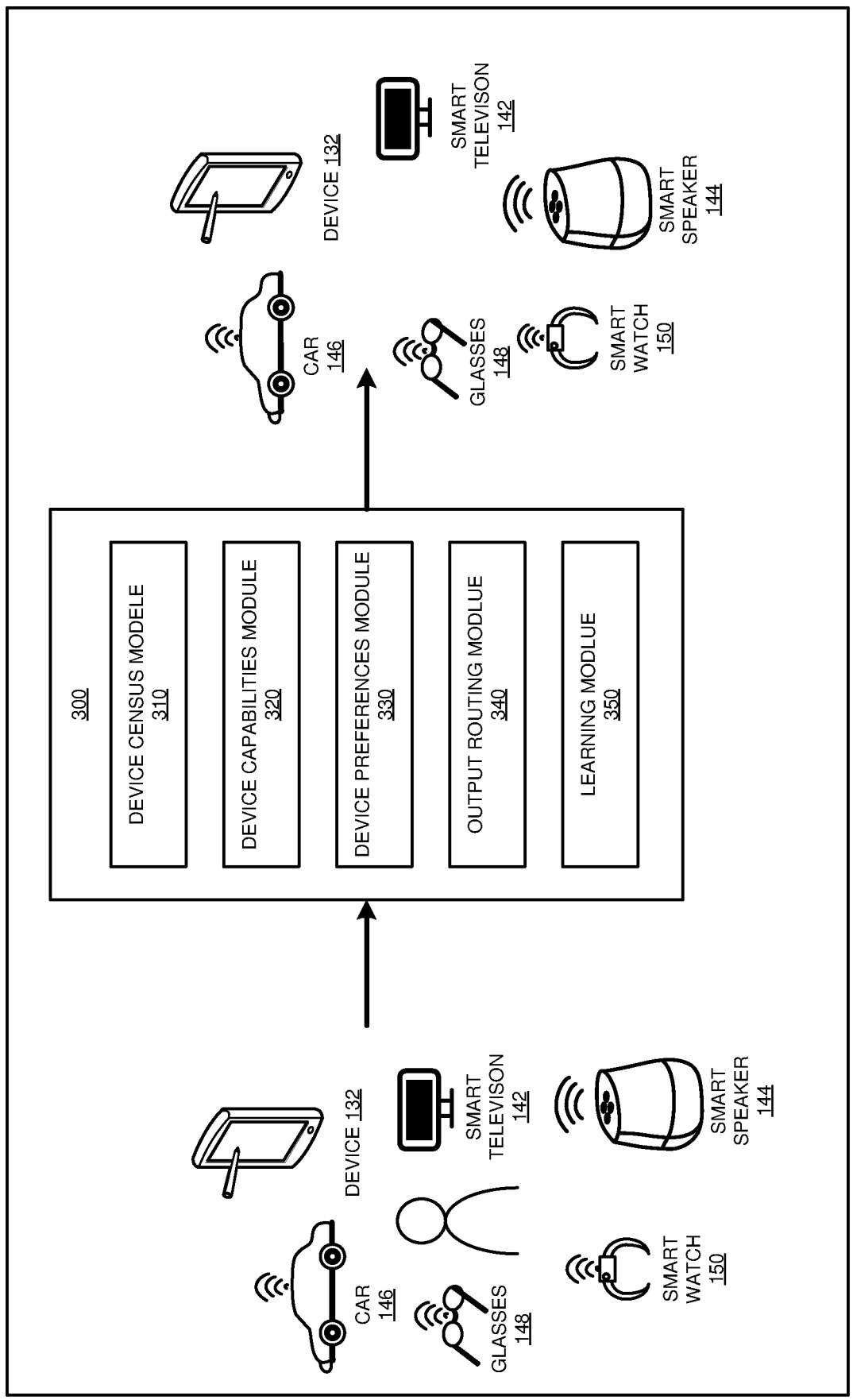
FIG. 3 depicts a block diagram of an example configuration for intelligent multi-device user interaction in accordance with an illustrative embodiment.

With reference to FIG. 3, this figure depicts a block diagram of an example configuration for intelligent multi-device user interaction in accordance with an illustrative embodiment. Application 300 is an example of application 105 in FIG. 1 and executes in any of servers 104 and 106, clients 110, 112, and 114, device 132, smart television 142, smart speaker 144, car 146, smart glasses 148, and smart watch 150 in FIG. 1. Device 132, smart television 142, smart speaker 144, car 146, smart glasses 148, and smart watch 150 are the same as device 132, smart television 142, smart speaker 144, car 146, smart glasses 148, and smart watch 150 in FIG. 1.

Device census module 310 determines which devices a user regularly interacts with. Device census module 310 asks a user to specify the devices, determines devices without the user's explicit specification, or a combination of both. To determine a user's devices without explicit specification, device census module 310 references all devices associated with a user's account, or monitors a user's activity to determine which devices a user regularly interacts with.

Device capabilities module 320 determines specific capabilities of a user's devices. A user can specify such capabilities, device capabilities module 320 determines such capabilities without a user's explicit specification, or a combination of both. To determine device capabilities, device capabilities module 320 can use a standard mechanism, such as by accessing a set of capabilities in a standard XML or other structured machine-readable format, or as part of a query-based or remote management capabilities determination mechanism. Device capabilities module 320 can also determine device capabilities by obtaining specifications for the devices, advertising material for the devices, or other descriptive material from any suitable source (such as stored in an embodiment or obtained by searching a network such as the Internet) and analyzing the specifications using NLP techniques.

Device preferences module 330 allows a user to specify an initial set of preferences, including device priorities, the use of single or multiple devices, and radius and location preferences. Device preferences module 330 includes a default initial set of preferences if the user chooses not to specify preferences.

Output routing module 340 monitors a user's input and circumstances to determine on which device (or devices) and using which format or formats to present output to the user. In particular, output routing module 340 maintains a prioritized list of available devices capable of presenting each type of output to a user. Output routing module 340 also updates the list of available devices change depending on a user's circumstances. When module 340 receives input from a user, module 340 consults the prioritized list of devices to see if any are available and sufficiently close to be used. If no nearby device is capable of presenting a particular content type, module 340 attempts to convert the content type to a different, supported content type. Output routing module 340 also enables a user to move an output presentation from one device to another.

Learning module 350 analyzes a user's activity to learn a user's preferences and usage patterns over time, using any suitable technique. Once learning module 350 determines that a user's preferences have changed, device preferences module 330 updates the user's preferences appropriately. Similarly, if learning module 350 determines that a user has a new device and is using the new device in a particular usage pattern, or if the user never uses a certain device, device census module 310, device capabilities module 320, and device preferences module 330 perform the necessary updates.

Figure 4:
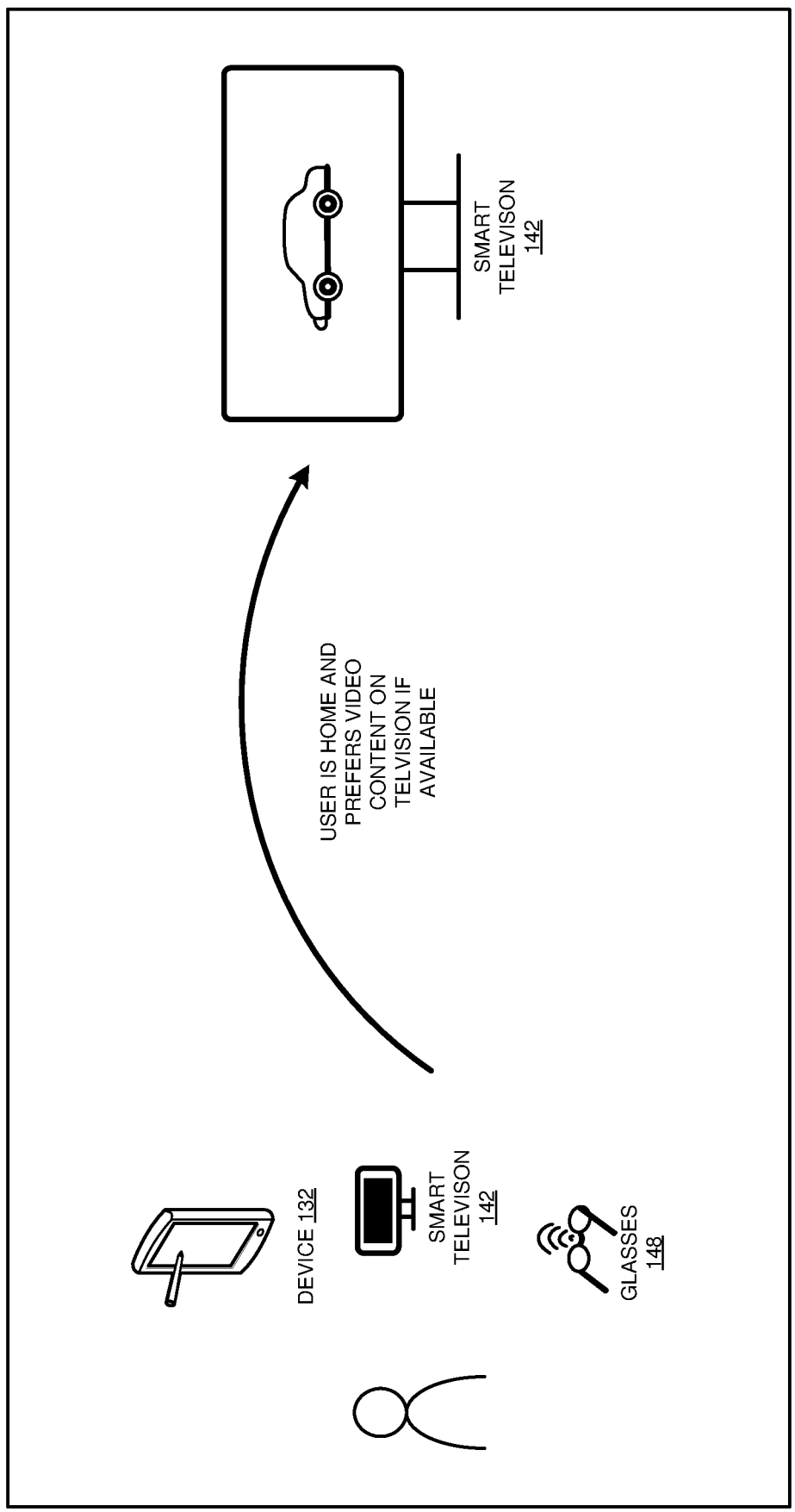
FIG. 4 depicts an example of intelligent multi-device user interaction in accordance with an illustrative embodiment.

With reference to FIG. 4, this figure depicts an example of intelligent multi-device user interaction in accordance with an illustrative embodiment. Device 132, smart television 142, and smart glasses 148 are the same as device 132, smart television 142, and smart glasses 148 in FIG. 1 and FIG. 3.

In FIG. 4, a user's devices include device 132, smart television 142, and smart glasses 148. Application 300 in FIG. 3 detects that a user is home, and has previously determined that when this user is home and near a television, he or she prefers to watch video content on television. As a result, when the user requests video content, the content is displayed on smart television 142.

Figure 5:
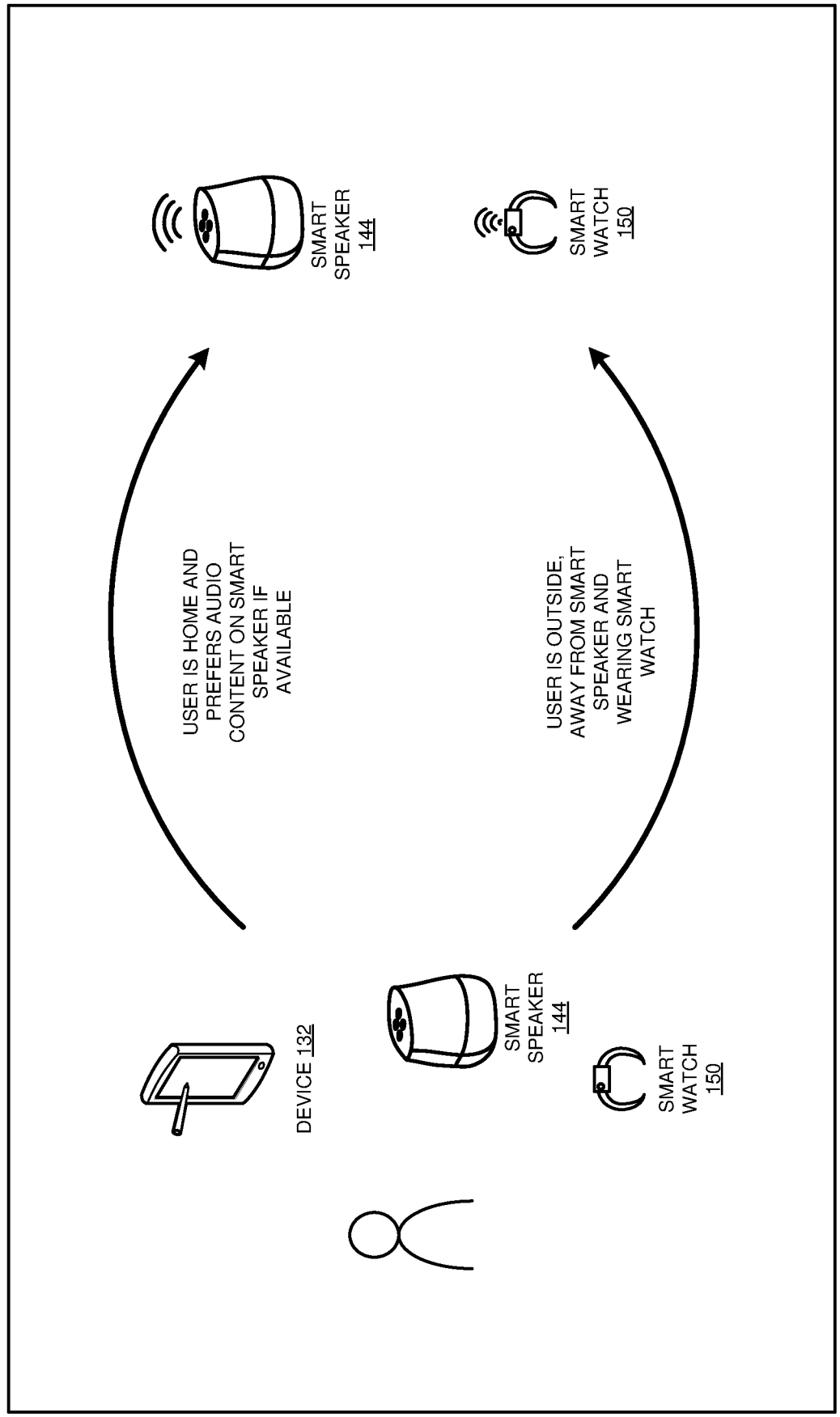
FIG. 5 depicts another example of intelligent multi-device user interaction in accordance with an illustrative embodiment.

With reference to FIG. 5, this figure depicts another example of intelligent multi-device user interaction in accordance with an illustrative embodiment. Device 132, smart speaker 144, and smart watch 150 are the same as device 132, smart speaker 144, and smart watch 150 in FIG. 1 and FIG. 3.

In FIG. 5, a user's devices include device 132, smart speaker 144, and smart watch 150. If application 300 in FIG. 3 detects that a user is home, and has previously determined that the smart speaker is the primary device for audio output when available, when the user requests audio content, the content is played on smart speaker 144. On the other hand, if application 300 in FIG. 3 detects that a user is not home and smart speaker 144 is not available, the content is played on smart watch 150 instead.

Figure 6:
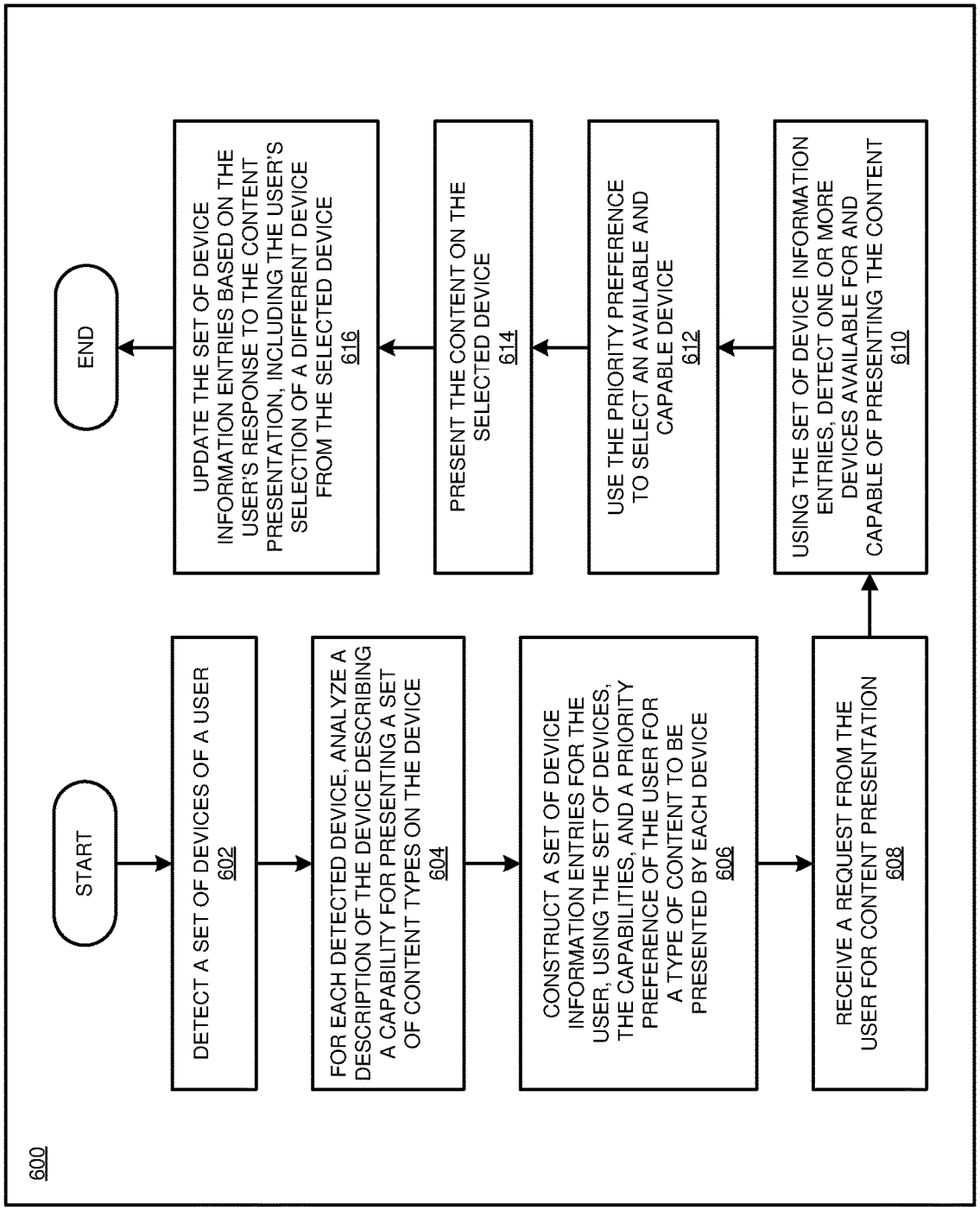
FIG. 6 depicts a flowchart of an example process for intelligent multi-device user interaction in accordance with an illustrative embodiment.

With reference to FIG. 6, this figure depicts a flowchart of an example process for intelligent multi-device user interaction in accordance with an illustrative embodiment. Process 600 can be implemented in application 300 in FIG. 3.

In block 602, the application detects a set of devices of a user. In block 604, the application, for each detected device, analyzes a description of the device describing a capability for presenting a set of content types on the device. In block 606, the application constructs a set of device information entries for the user, using the set of devices, the capabilities, and a priority preference of the user for a type of content to be presented by each device. In block 608, the application receives a request from the user for content presentation. In block 610, the application uses the set of device information entries to detect one or more devices available for and capable of presenting the content. In block 612, the application uses the priority preference to select an available and capable device. In block 614, the application presents the content on the selected device. In block 616, the application updates the set of device information entries based on the user's response to the content presentation, including the user's selection of a different device from the selected device. Then the application ends.

Thus, a computer implemented method, system or apparatus, and computer program product are provided in the illustrative embodiments for intelligent multi-device user interaction and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
constructing a set of device information entries corresponding to a set of devices, a device information entry comprising (i) an indication of a capability of a device to present a content type, and (ii) a priority preference indicative of a priority of the device in a subset of devices wherein each device in the set of devices is capable of presenting the content type, the constructing comprising:
detecting, using a device interaction history of a user, a set of devices of the user; and
analyzing, for each device in the set of devices, a description of the device describing a capability for presenting a set of content types on the device, the analyzing comprising parsing, using natural language processing, an unstructured text description, the parsing extracting capability information used in the constructing, the description transferred over a first network from a first remote data processing system;
detecting, responsive to a request for presenting content of the content type, a sub-subset of the subset of devices, wherein the sub-subset is enabled in an area where the content is to be presented; and
presenting, on a first device selected from the sub-subset, the content of the content type.

2. The computer-implemented method of claim 1, further comprising detecting a device in the set of devices of the user based on the user's activity.

3. The computer-implemented method of claim 1, further comprising detecting a device in the set of devices of the user based on an account of the user associated with the device.

4. The computer-implemented method of claim 1, wherein analyzing, for each device in the set of devices, a description of the device comprises parsing a structured text description to extract capability information.

5. The computer-implemented method of claim 1, wherein detecting a sub-subset of the subset of devices further comprises determining a current location of the user.

6. The computer-implemented method of claim 1, wherein detecting a sub-subset of the subset of devices further comprises determining a current activity of the user.

7. The computer-implemented method of claim 1, further comprising:
updating the priority preference responsive to a device selection for the presentation.

8. The computer usable program product of claim 7, wherein the computer usable code is stored in a computer readable storage device in a data processing system, and wherein the computer usable code is transferred over a network from a remote data processing system.

9. The computer usable program product of claim 7, wherein the computer usable code is stored in a computer readable storage device in a server data processing system, and wherein the computer usable code is downloaded over a network to a remote data processing system for use in a computer readable storage device associated with the remote data processing system.

10. A computer usable program product comprising one or more computer-readable storage devices, and program instructions stored on at least one of the one or more storage devices, the stored program instructions comprising:
 program instructions to construct a set of device information entries corresponding to a set of devices, a device information entry comprising (i) an indication of a capability of a device to present a content type, (ii) a priority preference indicative of a priority of the device in a subset of devices wherein each device in the set of devices is capable of presenting the content type, the constructing comprising:
  detecting, using a device interaction history of a user, a set of devices of the user; and
  analyzing, for each device in the set of devices, a description of the device describing a capability for presenting a set of content types on the device, the analyzing comprising parsing, using natural language processing, an unstructured text description, the parsing extracting capability information used in the constructing, the description transferred over a first network from a first remote data processing system;
 program instructions to detect, responsive to a request for presenting content of the content type, a sub-subset of the subset of devices, wherein the sub-subset is enabled in an area where the content is to be presented; and
 program instructions to present, on a first device selected from the sub-subset, the content of the content type.

11. The computer usable program product of claim 10, further comprising program instructions to detect a device in the set of devices of the user based on the user's activity.

12. The computer usable program product of claim 10, further comprising program instructions to detect a device in the set of devices of the user based on an account of the user associated with the device.

13. The computer usable program product of claim 10, wherein program instructions to analyze, for each device in the set of devices, a description of the device comprises program instructions to parse a structured text description to extract capability information.

14. The computer usable program product of claim 10, wherein program instructions to detect a sub-subset of the subset of devices further comprises program instructions to determine a current location of the user.

15. The computer usable program product of claim 10, wherein program instructions to detect a sub-subset of the subset of devices further comprises program instructions to determine a current activity of the user.

16. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
 program instructions to construct a set of device information entries corresponding to a set of devices, a device information entry comprising (i) an indication of a capability of a device to present a content type, (ii) a priority preference indicative of a priority of the device in a subset of devices wherein each device in the set of devices is capable of presenting the content type, the constructing comprising:
  detecting, using a device interaction history of a user, a set of devices of the user; and
  analyzing, for each device in the set of devices, a description of the device describing a capability for presenting a set of content types on the device, the analyzing comprising parsing, using natural language processing, an unstructured text description, the parsing extracting capability information used in the constructing, the description transferred over a first network from a first remote data processing system;
 program instructions to detect, responsive to a request for presenting content of the content type, a sub-subset of the subset of devices, wherein the sub-subset is enabled in an area where the content is to be presented; and
 program instructions to present, on a first device selected from the sub-subset, the content of the content type.

* * * * *